United States Patent [19]

Yanawgisawa

[11] Patent Number: 5,127,281
[45] Date of Patent: Jul. 7, 1992

[54] COMPOSITE MOTION GUIDE DEVICE

[76] Inventor: Ken Yanawgisawa, 5175-1, Ooaza Toyoshina, Toyoshina-machi, Miniamazumi-gun, Nagano-ken, Japan

[21] Appl. No.: 651,969

[22] Filed: Feb. 7, 1991

[30] Foreign Application Priority Data

Feb. 19, 1990 [JP] Japan .................. 2-37846
Aug. 29, 1990 [JP] Japan .................. 2-229018

[51] Int. Cl.⁵ .................. F16H 27/02; F16D 13/44
[52] U.S. Cl. .................. 74/89.15; 192/91 A;
                              74/424.8 R; 74/424.8 B
[58] Field of Search .......... 74/58, 59, 89.15, 424.8 R,
                              74/424.8 A, 424.8 B; 192/18 A, 91 A

[56] References Cited

U.S. PATENT DOCUMENTS

| | | | |
|---|---|---|---|
| 2,604,788 | 7/1952 | Hauber | 74/58 X |
| 2,865,481 | 12/1958 | Giri De Teramala | 192/91 A X |
| 3,803,927 | 4/1974 | Lawler | 74/89.15 |
| 3,898,890 | 8/1975 | Simmons et al. | 74/424.8 B X |
| 3,912,058 | 10/1975 | Parkins | 192/91 A X |
| 4,438,986 | 3/1984 | Teramachi | 74/424.8 R X |
| 4,497,215 | 2/1985 | Gronbech et al. | 74/89.15 |
| 4,509,379 | 4/1985 | Westmoreland | 74/58 |
| 4,560,051 | 12/1985 | Brandenstein et al. | 192/91 A X |
| 4,920,816 | 5/1990 | Inabe et al. | 74/424.8 A |
| 4,939,946 | 7/1990 | Teramachi | 74/89.15 |

Primary Examiner—Allan D. Herrmann
Assistant Examiner—David W. Laub

[57] ABSTRACT

In a composite motion guide device comprising a drive shaft having a spiral screw groove grooved on the outer circumferential face and a linear spline groove grooved thereon in the axial direction to cross the screw groove, a rotatable screw-rotor covering the drive shaft and screwing the screw groove thereon, and a rotatable spline-rotor covering the drive shaft and engaging with the spline groove thereon, the screw-rotor and the spline-rotor can be selectively rotated by a single driving device with a clutch. Therefore, the structure of the device can be simpler, so that a light, small and economical composite motion guide device can be provided.

10 Claims, 8 Drawing Sheets

COMPOSITE MOTION GUIDE DEVICE

BACKGROUND OF THE INVENTION

The present invention relates to a composite motion guide device, more precisely relates to a composite motion guide device for guiding movement of a drive shaft in the axial and rotational directions thereof.

There was disclosed an example of conventional composite motion guide devices in the U.S. Pat. No. 4,939,946, (Jul. 10, 1990, Inventor: H. Teramachi). This conventional device has a drive shaft having a sprial screw groove grooved on the outer circumferential face and a linear spline groove grooved thereon in the axial direction to cross the screw groove, a rotatable screw-rotor covering the drive shaft and screwing the screw groove thereon, a rotatable spline-rotor covering the drive shaft and engaging with the spline groove thereon, and two motors for respectively rotating the screw-rotor and the spline-rotor. The drive shaft can be moved in the axial and rotational directions thereof by selectively driving the motors.

The above stated device has enough function for moving the drive shaft, however, it has the following disadvantage. The device must have two motors for selectively rotating the two rotors. Therefore, the manufacturing cost are increased and the device becomes big and heavy.

SUMMARY OF THE INVENTION

An object of the present invention is to provide an inexpensive and compact composite motion guide device.

To achieve the object, the present invention has the following structure. Namely, in a composite motion guide device comprising a drive shaft having a spiral screw groove grooved on the outer circumferential face and a linear spline groove grooved thereon in the axial direction to cross the screw groove, a rotatable screw-rotor covering the drive shaft and screwing the screw groove thereon, and a rotatable spline-rotor covering the drive shaft and engaging with the spline groove thereon, wherein the improvement comprises, single driving means for selectively rotating the screw-rotor and the spline-rotor, and clutching means for connecting and disconnecting one of the screw-rotor and the spline-rotor to and from the other.

With this structure, the torque inputted from the single driving means can be transmitted or cut the transmission from one of the screw-rotor and the spline-rotor to the other by the clutching means. Thus, the screw-rotor and the spline-rotor can be selectively rotated by the single driving means. Therefore, the torque inputted to one of the screw-rotor and the spline-rotor can be transmitted to or cut the transmission from the other, so that the device can be operated by only one driving means. One expensive driving means can be avoided, and the device will be very economical. The clutching means can be assembled in the device so that the device can be light and compact. Controlling a single driving means is easier than controlling the conventional device having two driving means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described by way of examples and with reference to the accompanying drawings which are given by way of illustration only, and thus are not limitative of the present invention, and in which.

DETAILED DESCRIPTION OF THE PREFERRED EMBODIMENTS

Preferred embodiments of the present invention will now be described in detail with reference to the accompaying drawings.

First Embodiment

The first embodiment will be explained with reference to FIGS. 1-4.

Figure 1:
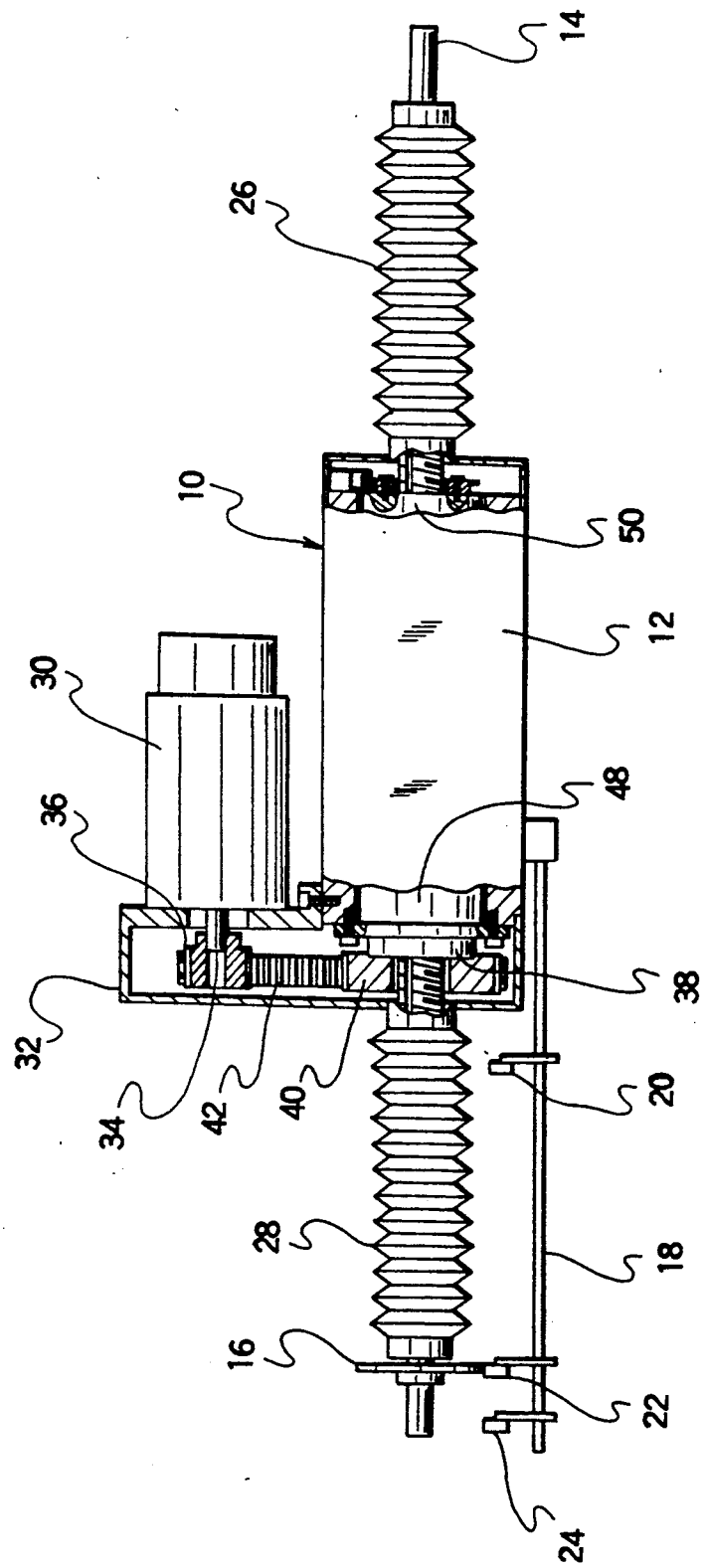
FIG. 1 shows a partial cutaway front view of a composite motion guide device of a first embodiment.

FIG. 1 shows a motion guide device of this embodiment.

A clutch 10 is assembled in a housing 12. A known mechanism (described later) for guiding composite motion of a drive shaft 14 is accommodated in the housing 12. Tools, etc. (not shown) will be attached to the right end of the drive shaft 14, and the tool can be rotated on the axis of the drive shaft 14 and/or moved in the axial direction thereof. A dog 16 for detecting the position of the drive shaft 14 is attached to the left end of the drive shaft 14, and a rail 18 whose right end is fixed to the outer face of the housing 12 is provided in parallel to the drive shaft 14. Sensors (limit switches) 20, 22 and 24 are fixed on the rail 18. The sensor 20 is provided to detect the left dead point of the stroke of the drive shaft 14; the sensor 22 is to detect the home position thereof; and the sensor 24 is to detect the right dead point thereof. Note that, the drive shaft 14 is covered with bellows 26 and 28.

A D.C. servo motor 30 acts as driving means and is fixed on a right side face of a transmission-housing 32, which is fixed to the housing 12. The output shaft 34 of the motor 30 is extended into the transmission-housing 32, and a timing pulley 36 is fixed at the front end of the output shaft 34. While, a timing pulley 40 is fixed on left end face of a screw-rotor 38, which is one of members consisting of the known mechanism for guiding the drive shaft 14, in the housing 12. Note that, the drive shaft 14 is pierced through the center hole of the timing pulley 40 without touching the inner face of the center hole.

A timing belt 42 is engaged with the timing pulleys 36 and 40, so that the torque of the motor 30 can be transmitted to the screw-rotor 38. With this structure, the screw-rotor 38 is always connected to the motor 30. The rotational position (angle) of the screw-rotor 38 can be detected and controlled by a control system, which includes an encoder of the motor 30. The rotational direction of the motor 30 can be controlled by changing direction of electric current inputted to the motor 30.

Successively, the clutch 10 and the known mechanism for guiding the drive shaft 14 will be explained with reference to FIG. 2.

A spiral screw groove 44 is grooved on the outer circumferential face of the drive shaft 14. A plurality of linear spline grooves 46 are also grooved thereon in the axial direction to cross the screw groove 44.

The screw-rotor 38 is formed as a ball bearing with an outer wheel 48, which is fixed at the left end of the housing 12, and balls 51, so that the screw-rotor 38 is rotatable with respect to the housing 12. The screw-rotor 38 is screwed to the screw groove 44 with multiple balls (not shown). Note that, as described above, the timing pulley 40 (not shown in FIG. 2) is fixed to the left end section, which is outside of the housing 12, of the screw-rotor 38.

A spline-rotor 50 is formed as a ball bearing with an outer wheel 52, which is provided in the right end section of the housing 12, and balls 54, so that the spline-rotor 50 is rotatable with respect to the housing 12. The spline-rotor 50 covers the drive shaft 14. Engaging sections (not shown), which are formed on the inner face of the center hole of the spline-rotor 50, are engaged with the spline grooves 46 with multiple balls (not shown).

Note that, the basic structure of the known mechanism for guiding the drive shaft 14 consists of the drive shaft 14, the screw-rotor 38 and the spline-rotor 50. This structure is the same as the conventional composite motion guide device (see U.S. Pat. No. 4,939,946). Therefore, the drive shaft 14 moves in the axial direction thereof when the screw-rotor 38 rotates but the spline-rotor 50 does not rotate. This mode is achieved by movement of the clutch toward the right which disengages the spline-rotor 50 from the torque transmitting interface. When the clutch is moved to the left, permitting engagement of the spline-rotor 50 with the torque transmission interface, the drive shaft 14 rotates on the axis thereof when the screw-rotor 38 and the spline-rotor 50 rotate. And in an embodiment wherein the motor can directly drive the spline-rotor 50, the drive shaft 14 moves in the axial direction and rotates to make spiral movement when the spline-rotor 50 rotates but the screw-rotor 38 does not rotate.

Next, the structure of the clutch 10 will be explained.

A tapered cylinder 56 is fixed on the right end face of the screw-rotor 38. The drive shaft 14 is pierced through the center hole of the tapered cylinder 12 without touching the inner face of the center hole. The right end section of the tapered cylinder 56 is formed as a tapered section. The outer diameter of the tapered section is gradually reduced toward the front end. The outer face of the tapered section is defined as a tapered face 58. The tapered cylinder 56 is rotatably supported by a bearing 60.

A hollow fixture 62 is fixed on the inner face of the housing 12 by a bolt 64 and a pin 66.

A hollow piston 68, which is one example of releasing means, has a small-diameter section 70 on left side and a large-diameter section 72 on right side. The small-diameter section 70 is inserted into the fixture 62 and is capable of sliding on the inner face of the fixture 62; the large-diameter section 72 is capable of sliding on the inner face of the housing 12. The piston 68 can be slightly moved in the axial direction thereof. The tapered cylinder 56 is pierced through the center hole of the piston 68 without touching. There is fixed a cut-out flange 74 at the left end of the piston 68. The cut-out flange 74 engages with the left end section of the fixture 62 (see FIG. 3: the sectional view taken along line III—III in FIG. 2).

Figure 3:
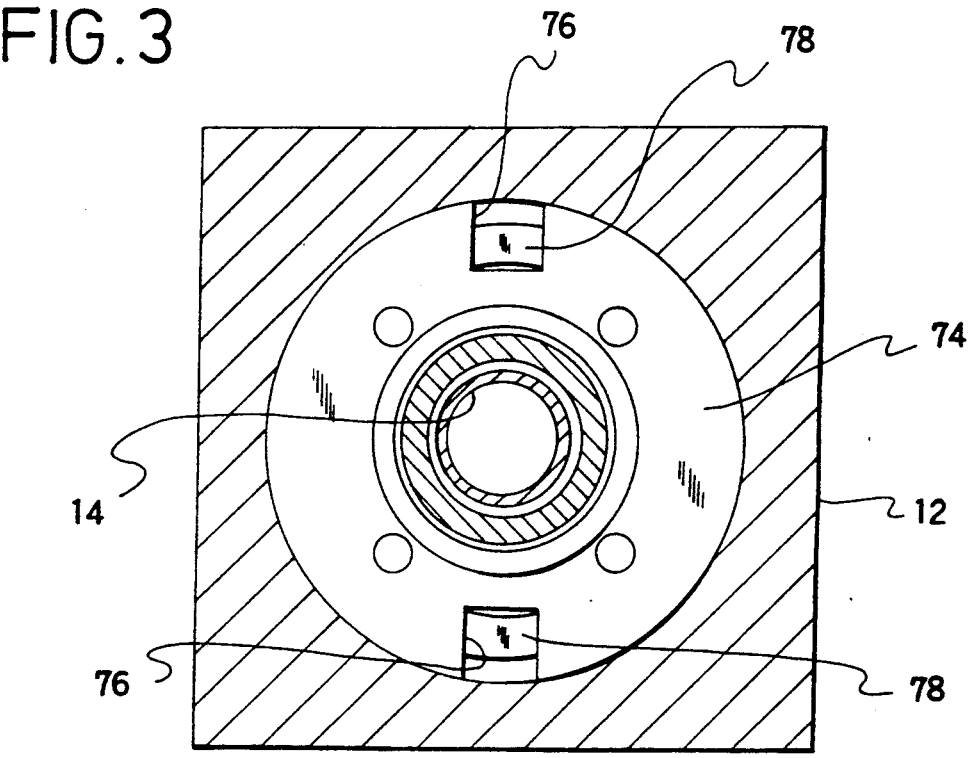
FIG. 3 shows a sectional view taken along line III—III in FIG. 2.
Figure 4:
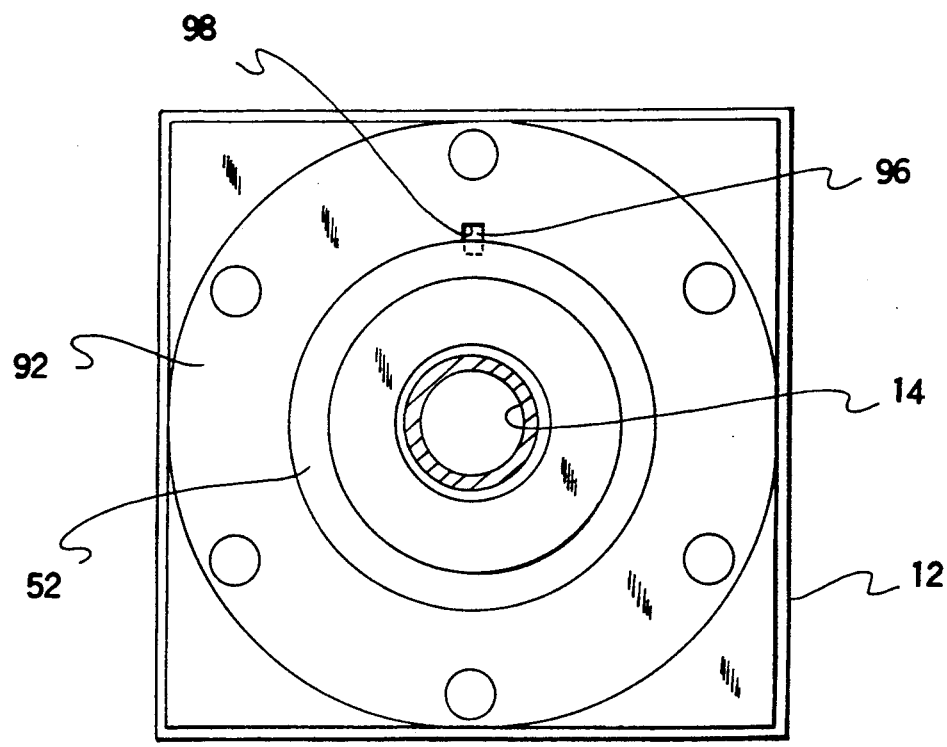
FIG. 4 shows a sectional view taken along line IV—IV in FIG. 2.

In FIG. 3, the cut-out flange 74 has cut out sections 76, and projected sections 78 of the fixture 62, which are projected of the left end from the fixture 62 to the left, with the cut out sections 76. With this structure, the piston 68 can be moved in the axial direction thereof but cannot be rotated on the axis thereof.

Figure 2:
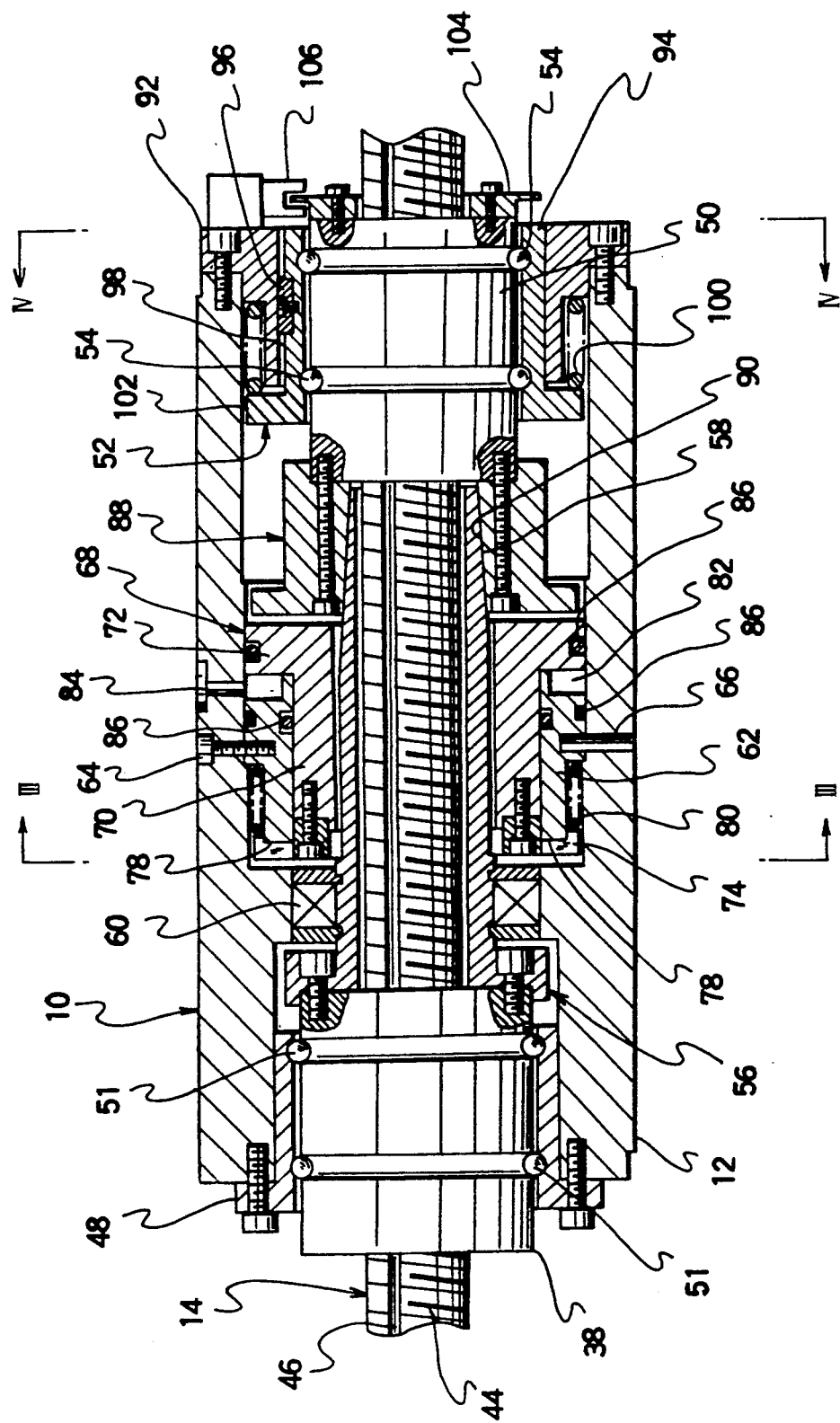
FIG. 2 shows a front sectional view of a clutch section of the device.

In FIG. 2, a spring 80 is provided between the cut-out flange 78 and the fixture 62, and always biases the piston 68 to the left.

An air chamber 82 is formed between the fixture 62 and the piston 68. An air port 84, which opens in the housing 12, is connected to the air chamber 82. The air port 84 is connected to a compressor (not shown) by tubes (not shown). Note that, the air chamber 82 is sealed by O-rings 86.

A taper-receiving section 88 is fixed at the left end of the spline-rotor 50. The taper-receiving section 88 is hollow, and its inner face is formed as a taper-receiving face 90 corresponding to the tapered face 58 of the tapered cylinder 56. Therefore, the tapered face 58 of the tapered cylinder 56, which is inserted into the taper-receiving section 88, can be tightly fit to the taper-receiving face 90 of the taper-receiving section 88.

The outer wheel 52, which forms a ball bearing with the spline-rotor 50, engages with a fixed section 92, which is fixed at the right end section of the housing 12. A key 96 is fixed on an upper face of a small-diameter section 94 of the outer wheel 52, and the key 96 engages with a key groove 98 of the fixed section 92 (see FIG. 4: the sectional view taken along line IV—IV in FIG. 2). With this engagement, the outer wheel 52 can be slightly moved in the axial direction thereof together with the spline-rotor 50 but cannot be rotated on the axis thereof. The spline-rotor 50, of course, can be rotated with respect to the outer wheel 52.

A spring 100, one example of elastic means, is provided between the fixed section 92 and a large-diameter section 102 of the outer wheel 52, and always biases the outer wheel 52 to the left.

A rotary disk 104 for encoding is fixed on the right end face of the spline-rotor 50. The rotation of the rotary disk 104 is detected by a photo sensor 106 fixed in the housing 12, so that the rotational position (angle) of the spline-rotor 50 can be detected.

Next, the function of the composite motion guide device with the above described structure will be explained with reference to FIGS. 1 and 2.

In FIG. 2, the spline-rotor 50 has been moved to the left by the spring 100, and the taper-receiving face 90 of the taper-receiving section 88 is tightly fit to the tapered face 58 of the tapered cylinder 56. Therefore, the tapered cylinder 56 and the taper-receiving section 88 are connected with each other.

In this status, upon driving the motor 30, the torque of the motor 30 is transmitted to the spline-rotor 50 via the output shaft 34, the timing pulley 36, the timing belt 42, the timing pulley 40, the screw-rotor 38, the tapered cylinder 56, and the taper-receiving section 88. Thus, the screw-rotor 38 and the spline-rotor 50 rotate together, so that the drive shaft 14 rotates on the axis thereof.

When compressed air is introduced into the air chamber 82 from the compressor (not shown), the piston 68 moves to the right against the elasticity of the spring 80, and the right end face of the piston 68 touches the left end face of the taper-receiving section 88. At least one of the right end face of the piston 68 and the left end face of the taper-receiving section 88 is knurled or is adhered a high friction material, so that the rotation of the taper-receiving section 88 and the spline-rotor 50 is stopped.

When the piston 68 is further moved to the right by compressed air, the taper-receiving section 88, the spline-rotor 50 and the outer wheel 52 are pushed to the right against the elasticity of the spring 100. Then the tapered face 58 of the tapered cylinder 56 disengages from the taper-receiving face 90 of the taper-receiving section 88, and the torque transmitted to the spline-rotor 50 via the taper-receiving face 90 is stopped. Because torque is no longer transmitted to the spline-rotor 50, the member does not continue to rotate, but the screw-rotor 38 continues to rotate, so that the drive shaft 14 moves linearly passing freely through the spline-rotor 50 via the ball bearing arrangement as described in the above-noted U.S. Pat. No. 4,939,946, for example.

With the operation of the clutch 10, the spline-rotor 50 rotates and stops its rotation. To control the rotational position (angle) of the spline-rotor 50, it is necessary, for example, to return back the rotational position to the initial position, so the device of this embodiment has a rotational-position-detector including the rotary disk 104 and the photo sensor 106. With this rotational-position detector, the rotational position of the spline-rotor 50 can be controlled independently of the screw-rotor 38.

The position in the axial direction of the drive shaft 14 can be detected by the dog 16 and the sensors 20, 22 and 24.

In this embodiment, the torque of the motor 30 is directly inputted to the screw-rotor 38 and transmitted to the spline-rotor 50 by the clutch 10. In a variation of this embodiment, the torque of the motor 30 may be directly inputted to the spline-rotor 50 and transmitted to the screw-rotor 38 by the clutch 10. In this case, the drive shaft 14 is still capable of making the rotation and the spiral movement. And the rotational position of the spline-rotor 50 may be controlled by the encoder of the motor 30; the rotational position of the screw-rotor 38 may be controlled by the rotational-position-detector.

Second Embodiment

The second embodiment will be explained with reference to FIGS. 5-7.

The clutch 10 of first embodiment is modified in this embodiment. Note that, elements which are the same as First Embodiment are assigned the same numerals with primes and the explanation thereof will be omitted.

In this embodiment, a ring 200 is fixed at the left end of the piston 68'. There are formed air chambers 202 and 204 on both sides of the fixture 62' by the piston 68', the inner face of the housing 12' and the ring 200. Compressed air can be introduced into the air chamber 202 and 204 from the compressor (not shown) and exhausted via air ports 206 and 208. The outer circumferential face of the right end section of the piston 68' is a tapered face 210.

The taper-receiving section 88' has the taper-receiving face 90' and a taper-receiving face 212 corresponding to the tapered face 210 of the piston 68'. The taper-receiving face 212 can be tightly fit to the tapered face 210.

The piston 68' is prevented from rotating by cam followers 214, which are fixed at the piston 68' and always contact stoppers 216 fixed at the housing 12'. In FIG. 6, the stoppers 216 can be moved to the right and left. If the stoppers 216 are fixed at positions where the stoppers 216 contact the cam followers 214, the cam followers 214 always contact the stoppers 216 and the piston 68' is prevented from rotation. Note that, the piston 68' can be slightly moved in the axial direction thereof by compressed air.

Lower end of a bolt 218, which is fixed at the housing 12' is inserted in a slit 220, which is formed in the left flange section of the outer wheel 52', so that the outer wheel 52' is prevented from rotation and allowed slight movement in the axial direction thereof.

Figure 5:
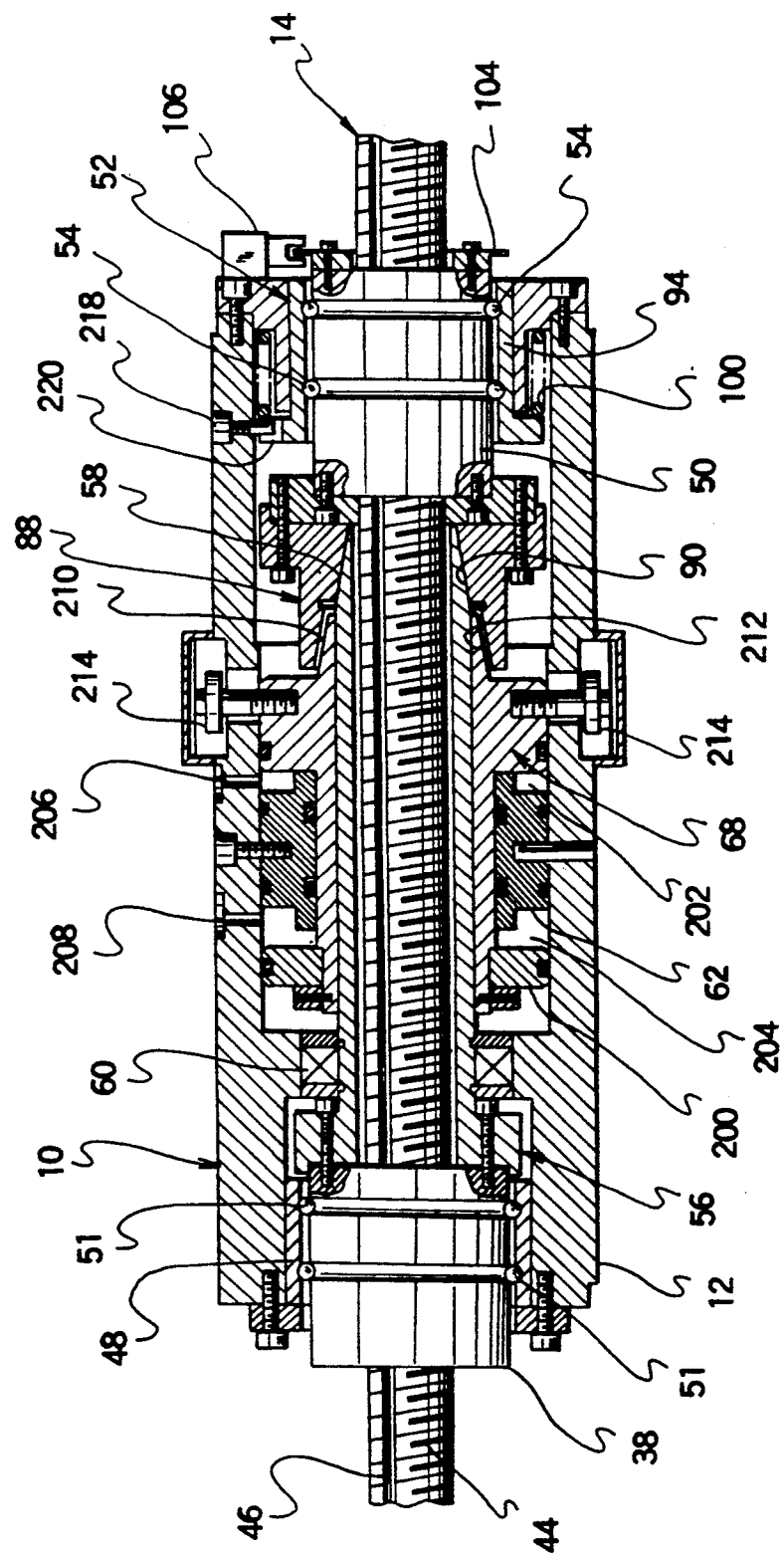
FIG. 5 shows a front sectional view of a clutch section of a second embodiment.

In FIG. 5, the tapered face 58' of the tapered cylinder 56' is tightly fit to the taper-receiving face 90' of the taper-receiving section 88', so that the screw-rotor 38' and the spline-rotor 50' rotate together.

When compressed air is introduced into the air chamber 202 via the air port 206, the piston 68' moves to the right and the tapered face 210 tightly fits to the taper-receiving face 212, so that the rotation of the taper-receiving section 88' and the spline-rotor 50' is stopped because of friction between both faces.

The piston 68' further pushes the taper-receiving section 88', the spline-rotor 50', etc. against the elasticity of the spring 100', and then the tapered face 58' moves away from the taper-receiving face 90', so that the clutch 10' disconnects the spline-rotor 50' and the screw-rotor 38' only rotates.

To connect the spline-rotor 50' again, compressed air in the air chamber 202 is exhausted and compressed air is introduced into the air chamber 204. The piston 68' moves to the left and the taper-receiving section 88' is also pushed to the left by the spring 100. First, the tapered face 58 of the tapered cylinder 56 is tightly fit to the taper-receiving face 90 of the taper-receiving section 88 so as to connect the clutch 10'. After the connection, the tapered face 210 moves away from the taper-receiving face 212, so that the spline-rotor 50' can be rotated with the screw-rotor 38'. Note that, the piston may be moved to connect the clutch 10' by elastic means such as a spring instead of compressed air.

For disconnecting the clutch 10', first rotation of the spline-rotor 50' is stopped and then the clutch 10' is disconnected. With this sequence, slip rotation of the spline-rotor 50', which is caused by force working on the drive shaft 14', can be prevented. For connecting the clutch 10', the spline-rotor 50' can be rotated after the taper-receiving section 88' is connected to the tapered cylinder 56'.

Note that, in this embodiment, too, the movement of the drive shaft 14', etc. caused by the rotation of the screw-rotor 38' and the spline-rotor 50' is the same as the first embodiment.

Figure 7:
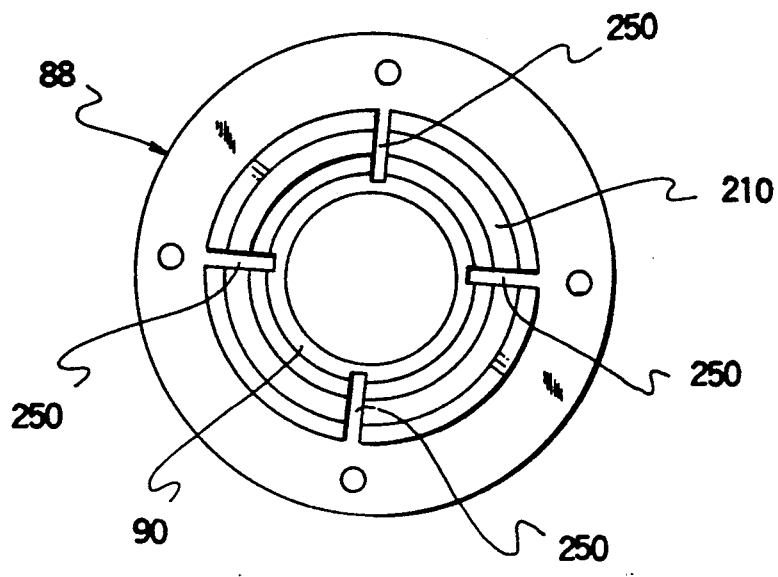
FIG. 7 shows a side view of another example of a taper-receiving section of the clutch section.

A modified example of the taper-receiving section 88' is shown in FIG. 7.

The taper-receiving section 88' has four slits 250, each of which is formed in the axial direction of the taper-receiving section 88'. The slits 250 are formed at the regular intervals in the circumferential direction of the taper-receiving section 88'. With the slits 250, the taper-receiving section 88' can be elastically deformed. If the axes of the piston 68' and the tapered cylinder 56' are mutually shifted a little when the tapered faces 210 and 56' fit to the taper-receiving section 88', the tapered faces 210 and 56' can be certainly fit to the taper-receiving section 88' by the elastic deformation thereof. Therefore, assembling accuracy of the clutch 10' need not be quite high.

Figure 9:
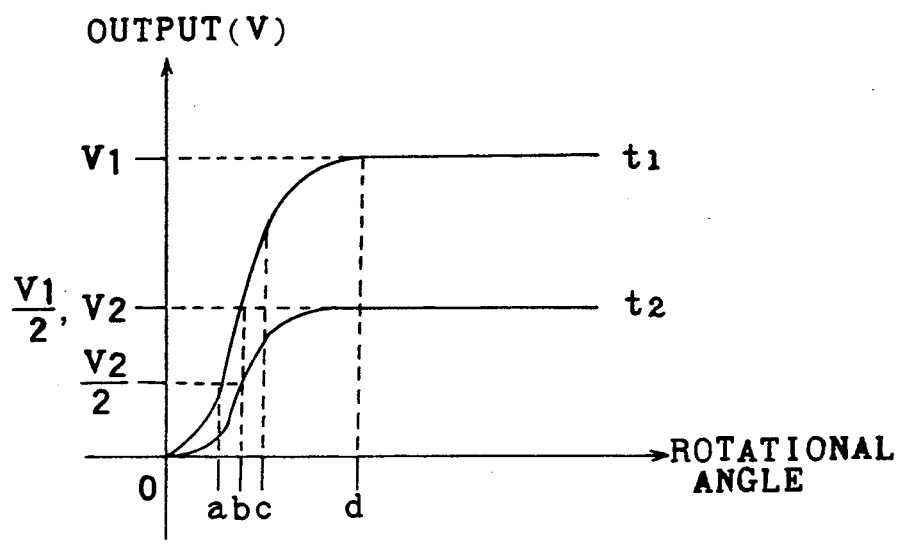
FIG. 9 shows a graph indicating relationship between output voltage of a sensor and rotational angle of a rotary disk.
Figure 10:
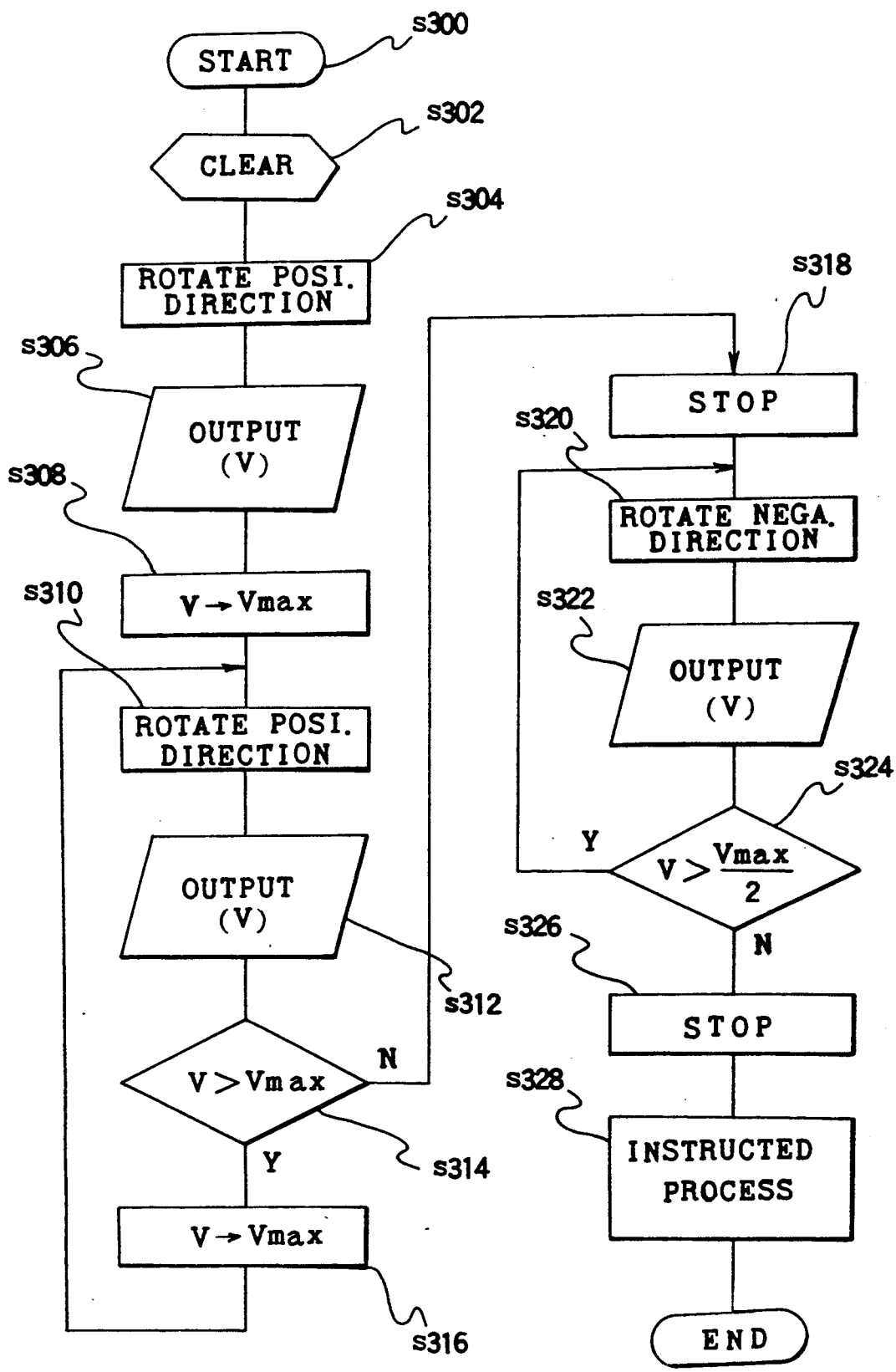
FIG. 10 shows a flowchart of the control system.

Successively, the action of the rotational-position detector and controlling the rotation of the spline-rotor 50' will be explained with reference to FIGS. 8-10.

First, a control system will be explained with reference to FIG. 8.

A micro processor (MPU) 260 controls every section of the system based on programs and data stored in a memory 262. A photosensor 106' outputs voltage [V] when the cut-out 105' (see FIG. 6) corresponds to the photosensor 106', and sends the output voltage [V] to the MPU 260. The MPU 260 is capable of defining the initial position (angle) of the rotary disk 104' and the spline-rotor 50' by reading the output voltage [V].

How to define the initial position will be explained with reference to FIG. 9.

The output voltage [V] of the photosensor 106' is zero when the photosensor 106' does not detect the cut-out 105' of the rotary disk 104'. While, the output voltage [V] gradually rises when the cut-out 105' corresponds to the photosensor 106' and reaches maximum output voltage [Vmax] at last. But the output voltage [V] is influenced by the temperature. In FIG. 9, Vmax is V1 when the temperature is $t_1$; Vmax is V2 when the temperature is $t_2$. Rotational angle required to reach Vmax is "d" in cases of temperature $t_1$ and $t_2$ but it is impossible to define the initial position of the rotary disk 104' by reading the output voltage [V] of the photosensor 106' because of changing temperature. The inventor noticed that the output voltage [V] linearly changes between rotational angle "a" and "c", so that defining the initial position of the rotary disk 104' is not influenced by temperature and the initial position can be fixed if the position of angle "b", where the output voltage [V] is Vmax/2, is defined as the initial position. Therefore, the spline-rotor 50' can be always set at the defined initial position by detecting Vmax, storing the Vmax in the memory 262, rotating the rotary disk 104' and the spline-rotor 50' in the negative direction, and stopping the rotation when the output voltage [V] reaches Vmax/2.

Figure 8:
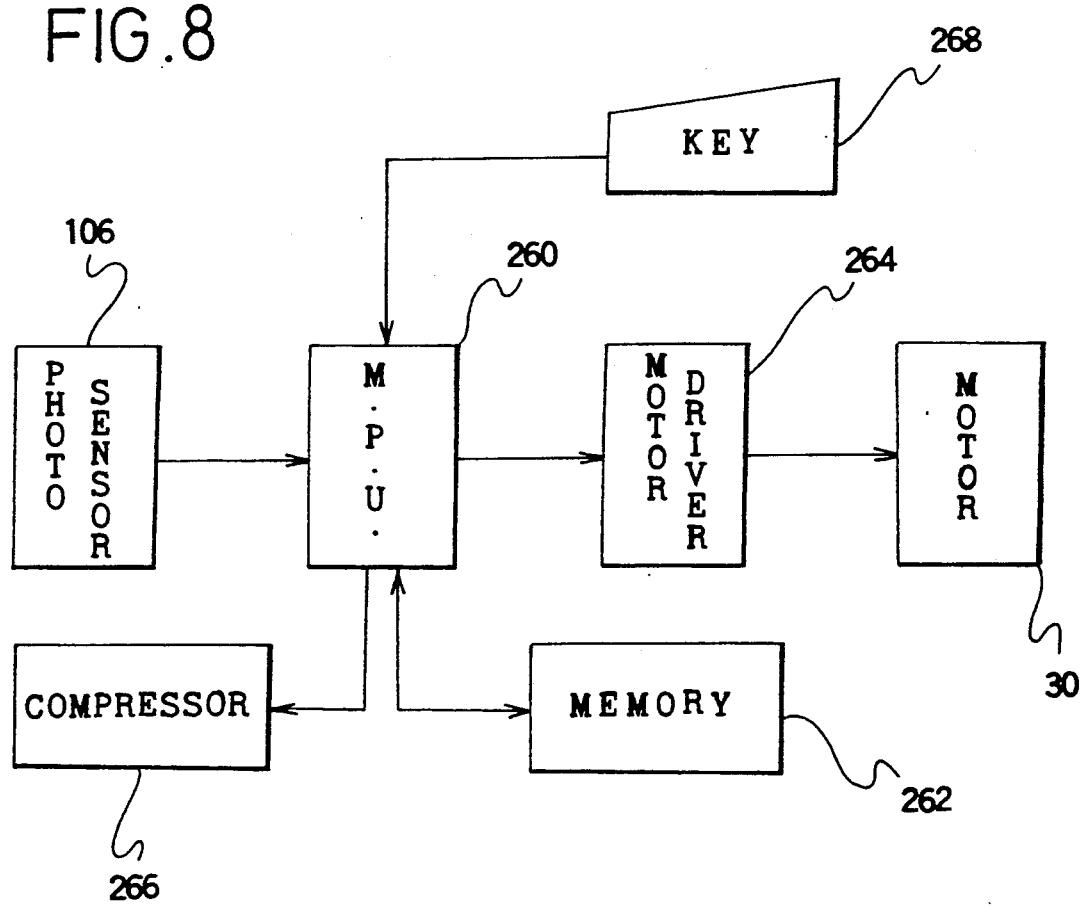
FIG. 8 shows a block diagram of a control system.

In FIG. 8, a motor driver circuit 264 supplies electric power to the motor 30' on the basis of the instruction from the MPU 260.

A compressor 266 selectively supplies compressed air to air chambers in the housing 12' on the basis of the instruction from the MPU 260.

An operator can input commands and data to the MPU 260 by key switches 268.

The action to set the spline-rotor 50' back to the initial position will be explained with reference to FIG. 10, a flowchart.

When an instruction to set the spline-rotor 50' back to the initial position is manually or automatically instructed to the MPU 260 (step 300), the MPU 260 clears the memory area for the output voltage [V] and the maximum output voltage [Vmax] in the memory 262 (step 302).

Figure 6:
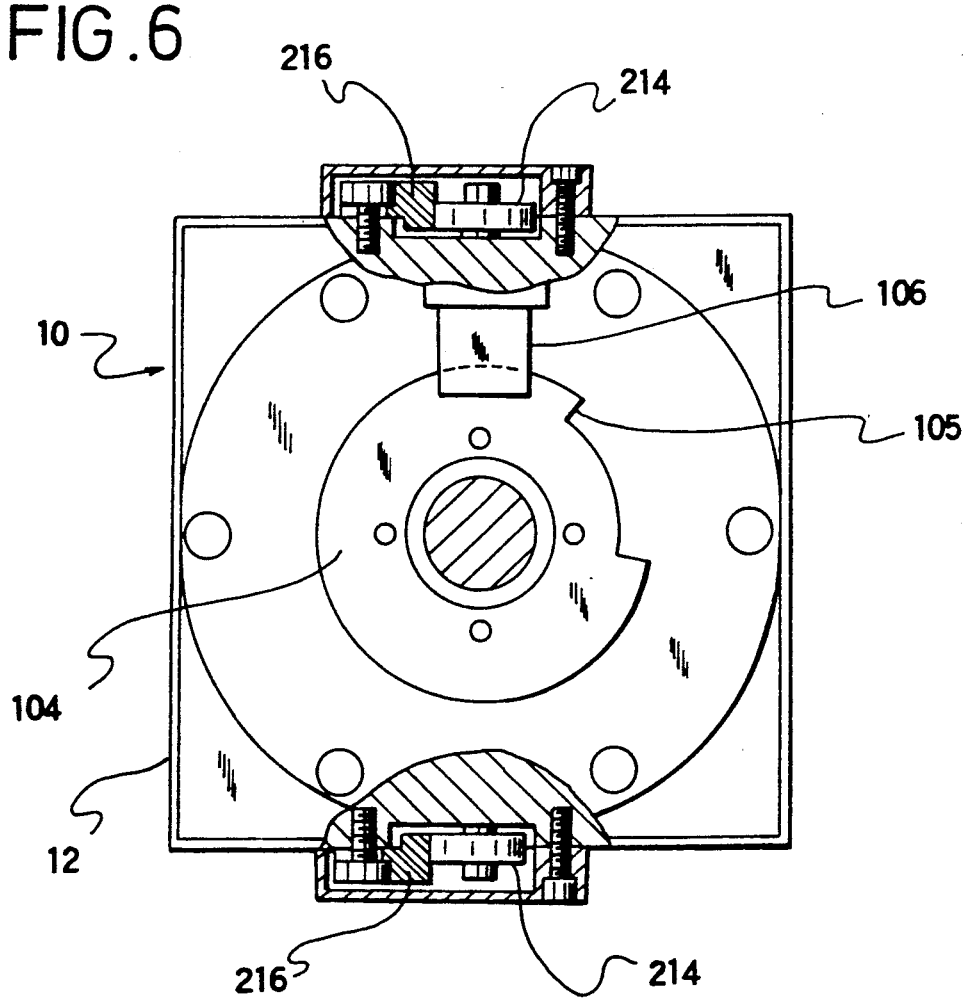
FIG. 6 shows a partial cutaway right side view of the clutch section.

Next, the MPU 260 controls valves of the compressor 266 to allow the spline-rotor 50' to rotate and rotates the motor 30' for a prescribed angle in the positive direction so as to rotate the spline-rotor 50' and the rotary disk 104' for the prescribed angle in the positive direction: e.g. counter clockwise direction in FIG. 6 (step 304).

The MPU 260 reads the output voltage [V] of the photosensor 106' (step 306), and stores the initial value of the output voltage [V] in the memory 262 as the maximum output voltage [Vmax] (step 308).

Further, the MPU 260 has the motor 30' and the rotary disk 104' with the spline-rotor 50' rotated for the prescribed angle in the positive direction (step 310), and reads the output voltage [V] of the photosensor 106' again (step 312).

The MPU 260 compares the latest output voltage [V] with the Vmax (step 314). If the result is V>Vmax, the output voltage [V] is judged as rising (the angle "0"–"d" in FIG. 9). And the Vmax in the memory 262 is replaced with the latest voltage [V] being considered as the present Vmax (step 316). Upon replacement, the MPU 260 goes back to the step 310 to repeat the requence. While, at the step 314, if the result is not V>Vmax or is V=Vmax, the present Vmax stored in the memory 262 becomes the true Vmax, and the output voltage [V] is judged to have been stabilized at the present Vmax (the angle is more than "d" in FIG. 9). In this case, the MPU 260 judges that the spline-rotor 50' and the rotary disk 104 beyond the initial position (the angle "d" in FIG. 9), and stops the motor 30' (step 318). Upon stopping the motor 30', the MPU 260 immediately rotates the motor 30' for the prescribed angle in the negative direction (step 320).

Rotating the motor 30' in the negative direction, the spline-rotor 50' and the rotary disk 104', too, rotate for the prescribed angle in the negative direction. The MPU 260 reads the output voltage [V]0 of the photosensor 106' (step 322), and confirms if the present V is V<Vmax/2 (step 324). Namely, the MPU 260 confirms whether the rotational position of the rotary disk 104' reaches the position corresponding to the angle "b" in FIG. 9 with reducing the voltage [V] or not. At the step 324, if the output voltage [V] is V>Vmax/2, the MPU 260 judges that the rotary disk 104' should rotate more in the negative direction and returns to the step 320. While, if the voltage [V] is V≦Vmax/2, the MPU 260 judges that the rotary disk 104' and the spline-rotor 50' are at the initial position and stops the motor 30' (step 326).

Thereafter the MPU 260 controls the motor driver circuit 264 and the compressor 266 so as to operate the motor 30' and the clutch 10' (step 328).

Third Embodiment

Figure 11:
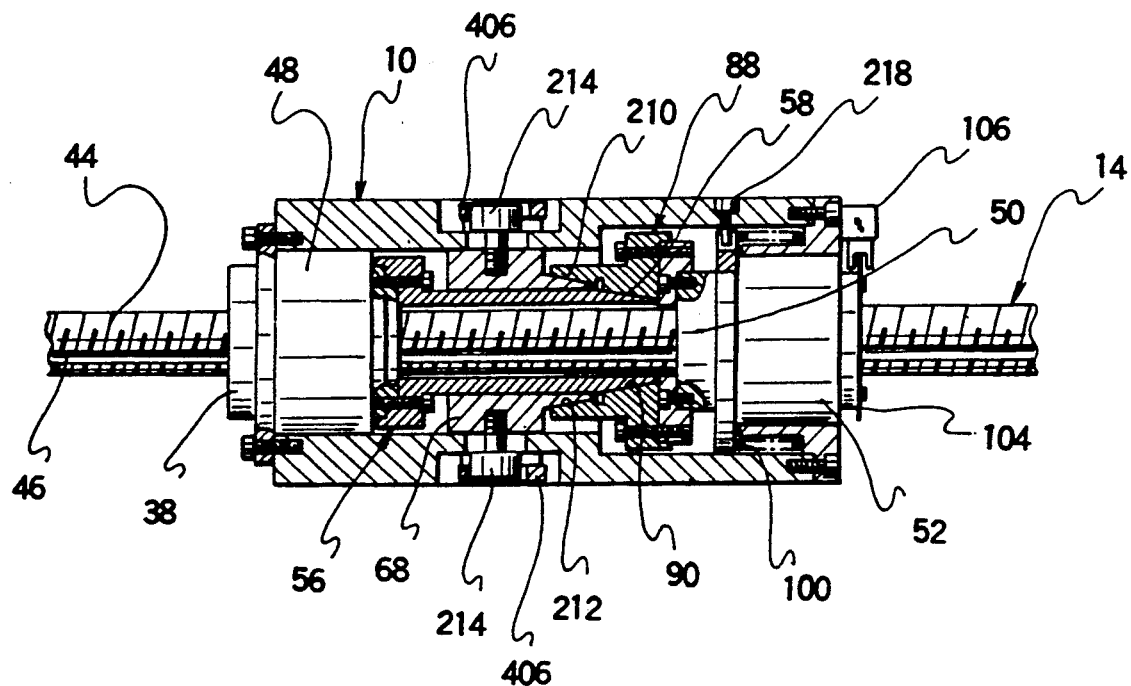
FIG. 11 shows a front sectional view of a clutch section of a third embodiment.
Figure 12:
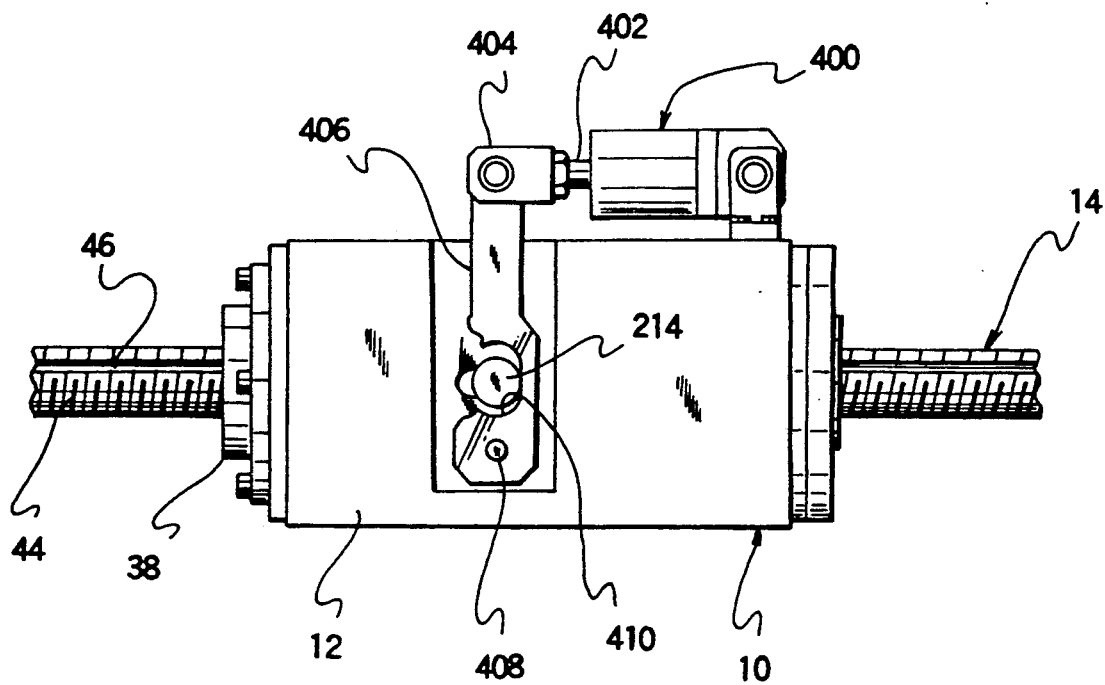
FIG. 12 shows a plan view of the clutch section.

The third embodiment will be explained with reference to FIGS. 11 and 12.

The clutch 10' of the second embodiment is modified in this embodiment. Note that, elements which are the same as former embodiments as assigned the same numerals with double primes and the explanation thereof will be omitted.

In the second embodiment, the piston 68" is driven by compressed air. In this third embodiment, the piston 68" is driven by an air cylinder unit 400, which is provided outside of the housing 12", as an actuator.

A connecting member 404, which is elongated in the direction perpendicular to an axis of the rod 402, is fixed at the front end of the rod 402 of the air cylinder unit 400. There are respectively and rotatably attached one ends of levers 406, which move the cam followers 214" and the piston 68" in the axial direction of the housing 12", at both ends of the connecting member 404. The other ends of the levers 406 are respectively and rotatably attached to shafts 408 which are fixed on the outer face of the housing 12". There is bored a long hole 410 in each lever 406. The outer circumferential face in the front end section of each cam follower 214" is in each long hole 410.

With this structure, when the rod 402 is extended and retracted by supplying compressed air to the air cylinder unit 400, the levers 406 rotate on the shafts 408 and move the cam followers 214" and the piston 68" in the axial direction of the housing 12". The action of the clutch 10" caused by the movement of the piston 68 is the same as the second embodiment, so the explanation is omitted.

The inner mechanism of the clutch 10" of the third embodiment is simpler than the second embodiment.

Preferred embodiment of the present invention have been described but the present invention is not limited to the above described embodiments. Many modifications can be allowed without deviating from the spirit of the invention.

What is claimed is:

1. A composite motion guide device comprising;
a drive shaft having a spiral screw groove grooved on an outer circumferential face and a linear spline groove grooved thereon in an axial direction to cross the screw groove;
a rotatable screw-rotor covering the drive shaft and screwing the screw groove thereon;
a rotatable spline-rotor covering the drive shaft and engaging the spline groove thereon;
single driving means for selectively rotating the screw-rotor and the spline-rotor;
clutching means for connecting and disconnecting one of the screw-rotor and the spline-rotor to and from the other,
the spline-rotor being movable in the axial direction of the drive shaft, and the clutching means having a tapered cylinder covering the drive shaft between the screw-rotor and the spline-rotor, a rear end section of the tapered cylinder being fixed to one of the screw-rotor and the spline-rotor and a front end section thereof being formed as a tapered section whose outer diameter is reduced toward the front end;
a cylindrical taper-receiving section covering the drive shaft between the screw-rotor and the spline-rotor, a rear end section of the taper-cylinder section being fixed to one of the spline-rotor and the screw-motor an inner face of the taper-receiving section being formed to tightly fit on an outer face of the tapered section of the tapered cylinder;
elastic means for biasing the spline-rotor toward the screw-rotor so as to fit the tapered cylinder and the taper-receiving section; and
releasing means being movable in the axial direction of the drive shaft, the releasing means pushing the spline rotor against the elasticity of the biasing means so as to move away from the screw-rotor and to release tight fitting of the tapered cylinder and the taper-receiving section when the releasing means moves so as to disconnect the screw-rotor and the spline-rotor.

2. The composite motion guide device according to claim 1, wherein the releasing means is driven by compressed air.

3. The composite motion guide device according to claim 1, wherein the releasing means is driven by an actuator.

4. The composite motion guide device according to claim 3, wherein the acutator is an air cylinder unit.

5. The composite motion guide device according to claim 1, further comprising a rotational-position-detector for detecting the rotational position of the screw-rotor or the spline-rotor.

6. The composite motion guide device according to claim 1, wherein the releasing means tightly fits to one of the taper-receiving section and the tapered cylinder, which is fixed to the spline-rotor before releasing of the tapered section and the inner face of the taper-receiving section when the releasing means moves to disconnect the screw-rotor and the spline-rotor.

7. The composite motion guide device according to claim 6, wherein the releasing means is driven by compressed air.

8. The composite motion guide device according to claim 6, wherein the releasing means is driven by an actuator.

9. The composite motion guide device according to claim 8, wherein the acutator is an air cylinder unit.

10. The composite motion guide device according to claim 6, further comprising a rotational-positon-detector for detecting

* * * * *

UNITED STATES PATENT AND TRADEMARK OFFICE
CERTIFICATE OF CORRECTION

PATENT NO. : 5,127,281
DATED : July 7, 1992
INVENTOR(S) : Ken Yanagisawa

It is certified that error appears in the above-indentified patent and that said Letters Patent is hereby corrected as shown below:

Title page, item [19] and [76], "Yanawgisawa", should read

--Yanagisawa--.

Signed and Sealed this

Seventh Day of September, 1993

*Attest:*

BRUCE LEHMAN

*Attesting Officer*     *Commissioner of Patents and Trademarks*